(12) United States Patent
Nieman

(10) Patent No.: US 11,426,051 B1
(45) Date of Patent: Aug. 30, 2022

(54) ACCORDION DISH DRYING RACK WITH UTENSIL HOLDER

(71) Applicant: Rachel Nieman, Brooklyn Park, MN (US)

(72) Inventor: Rachel Nieman, Brooklyn Park, MN (US)

( * ) Notice: Subject to any disclaimer, the term of this patent is extended or adjusted under 35 U.S.C. 154(b) by 0 days.

(21) Appl. No.: 17/308,859

(22) Filed: May 5, 2021

Related U.S. Application Data

(60) Provisional application No. 63/029,521, filed on May 24, 2020.

(51) Int. Cl.
*A47L 19/04* (2006.01)
*A47J 47/16* (2006.01)
*A47B 81/04* (2006.01)

(52) U.S. Cl.
CPC .............. *A47L 19/04* (2013.01); *A47J 47/16* (2013.01); *A47B 81/04* (2013.01)

(58) Field of Classification Search
CPC . A47J 47/16; A47J 47/20; A47L 19/04; A47L 19/00; A47L 19/02; A47L 15/50; A47L 15/503; A47L 15/505; A47L 15/502; A47L 17/00; A47L 17/02; A47G 19/08; A47G 21/14; A47G 23/0225; A47G 23/0208; A47B 81/04; A47B 55/02; A47F 7/0064
USPC ................................................ 211/41.2–41.6
See application file for complete search history.

(56) References Cited

U.S. PATENT DOCUMENTS

| | | | | |
|---|---|---|---|---|
| 542,734 | A * | 7/1895 | Johnson | A47L 19/04 211/74 |
| 2,562,982 | A * | 8/1951 | Cieri | A47L 19/04 211/41.6 |
| 6,513,674 | B1 * | 2/2003 | Kajikawa | A47L 15/503 211/41.6 |
| 7,578,401 | B2 * | 8/2009 | Schnitzer | A47L 19/04 211/41.6 |
| 10,039,420 | B2 * | 8/2018 | Housley | A47J 43/24 |
| D858,021 | S * | 8/2019 | Li | D32/55 |
| D921,318 | S * | 6/2021 | Ling | D32/55 |
| D921,319 | S * | 6/2021 | Xie | D32/55 |
| D928,442 | S * | 8/2021 | Zhan | D32/55 |
| 2005/0269273 | A1 * | 12/2005 | Yang | A47L 15/502 211/41.4 |
| 2008/0283480 | A1 * | 11/2008 | Segall | A47L 19/04 211/41.6 |

* cited by examiner

*Primary Examiner* — Devin K Barnett

(57) ABSTRACT

The present invention is a new design for a sink dish-drying rack, as set forth in the following specification and claims. The present invention which I name the Accordian Dish-drying rack with utensil holder can be placed inside a sink, secured by suction cups, not shown and only described, that slide into horizontal indents in the rear to suction to the sink. The Present invention collapses/reduces to a shorter length or extends to a longer length by pushing inward or pulling outward using the handle in the front. The purpose of collapsing to a shorter length is to save sink space when not in use. When the present invention is extended to a longer length it will hold dishes and utensils to dry. The present invention can be made of metal, rubber, steel, wood, plastic, or a combination materials.

8 Claims, 9 Drawing Sheets

ACCORDION DISH DRYING RACK WITH UTENSIL HOLDER

BACKGROUND OF THE INVENTION

1. Field of the Invention

The present invention relates to a dish-drying rack because usually a dish-drying rack sits inside the sink or on the counter top, and they always take up so much space no matter where they are located and it can be challenging to find a dish drying rack that will accommodate every style of sink.

2. The Prior Art

In the modern kitchen, it is common to use a dish drying rack with a sleek design that does not give the appearance of clutter on your counter or even inside your sink. And now so many different styles of sinks—from small farmhouse sinks in apartments and college dorms to double basin and large farmhouse sinks and everything in between, it is becoming more challenging to find a dish drying rack that will accommodate every style of sink, provide good drainage, offer a sleek modern design, and all with exceptional functionality and flexibility. With this new invention you can enjoy having the drying rack inside your sink without taking up all your sink space and not taking up any counter space at all. With some patented designs such as shown in U.S. Pat. Nos. 6,179,134B1, D490198S1, 222542A, 7,407,059B2, D7317285, D762934S1, 6,364,130B2, 7,407,059B2, and 8,573,410B2. They offer sleekness and functionality for the countertop, but still require if to be moved in between washing dishes if you need the counter space, or if you have a guest come over. For the above mentioned prior art that is designed for inside the sink, they are not convenient for the modern kitchen because they do not fit every style and size of sink.

SUMMARY OF THE INVENTION

The present invention overcomes certain shortcomings as mentioned above. In addition to the items mentioned above, my invention offers a sleek design, drainability, functionality and flexibility because you can collapse/reduce the size to desired length when not in use, and you can extend to desired length as you wash the dishes, or fully extend and then put dishes into this dish drying rack to dry. The main purpose of my invention is to use for dishes, but it is not limited to such use.

The Dish-drying rack with utensil holder can be used by placing it inside a sink and secured to the sink by suction cups or hooks, not shown and only described, that slide into horizontal indents in the rear to suction to and/or hang on the rim of the sink. The suction cups or hooks that can slide into the indents in the rear are not shown in pictures because they are offered in multiple sizes and styles, and because they are adjustable and can slide across the indents shown in the rear to offer options to secure to a sink.

The Present invention collapses/reduces to a shorter length by pushing inward using the handle in the front or by pushing in anywhere on the dishrack. The present invention extends to a longer length by pulling out using the handle in front or grabbing anywhere and pulling out. The present invention can be manufactured in multiple sizes allowing it to extend to different lengths fitting any sink size.

DESCRIPTION OF THE PREFERRED EMBODIMENTS

Figure 1:
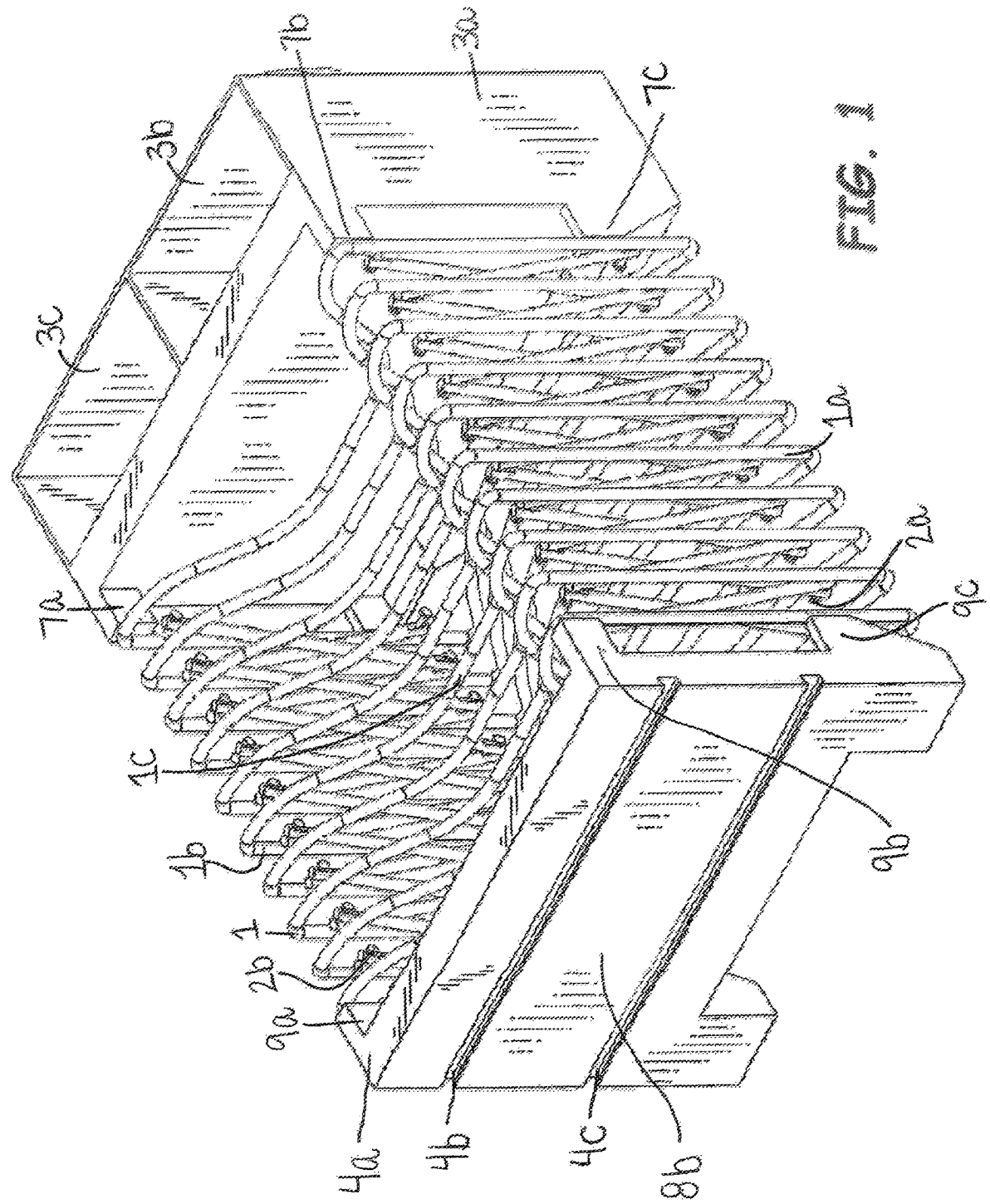
FIG. 1. is a perspective extended view of the Accordion Dish-drying Rack with Utensil Holder showing my new invention.
Figure 5:
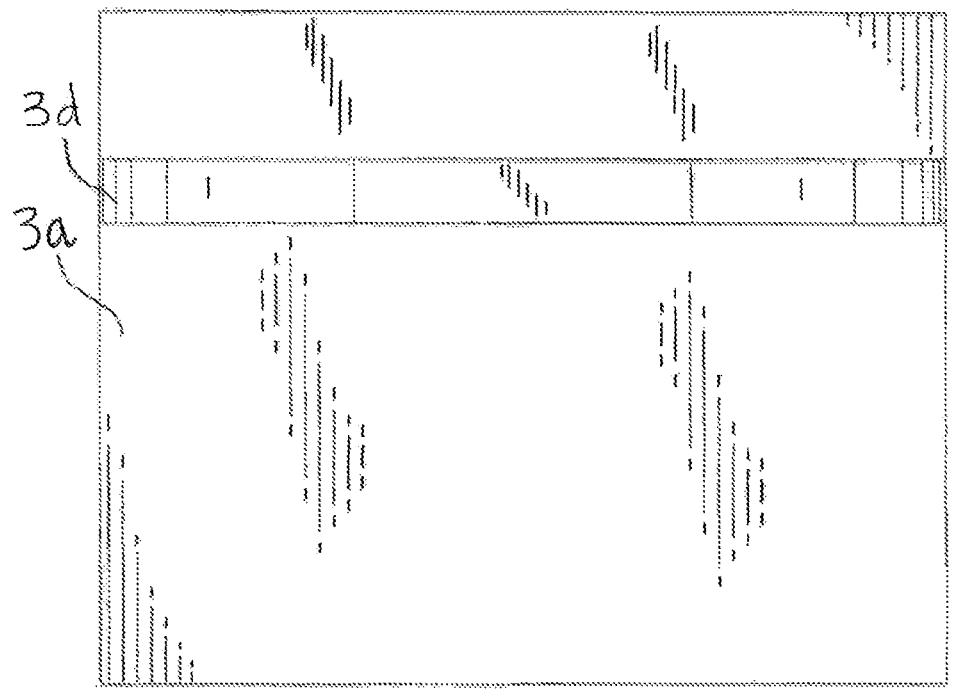
FIG. 5. is a front elevational view of my new invention shown in FIG. 1.

Referring to FIG. 1, showing slats 1 with unique curvature that have supporting cross members 5a & 5b on the side with pin connection mechanisms 2a & 2b that assist in holding the structure of the slats 1 and the cross members 5a & 5b together, when extended and collapsed. The bottom of the slats 1 act as "feet" providing support. The slats 1 can be constructed of metal, plastic, rubber, steel or a combination of materials. Slats 1 can be flat or curved or a combination of design, not limited to what is shown. The pin connecting mechanisms 2a & 2b and cross members 5a & 5b, as shown and described, connect the slats 1 that support the structure, and allow for the dish drying rack to extend to a greater length and collapse/reduce to a shorter length with ease. The front body 3a is connected to the slats 1 and provides stability and houses the utensil holders 3b & 3c that can be constructed of metal, plastic, rubber, steel or a combination of materials. The two utensil holders 3b & 3c have drainage grates/slits 3e & 3f on the bottom of each utensil holder 3b & 3c, and is not limited to the drawings provided. The utensil holders 3b & 3c can be made of metal, plastic, rubber, steel or a combination of materials. A handle 3d in the front, as shown in FIG. 5., is formed on the front body 3a. The handle 3d can assist in extending and collapsing the dish drying rack. The rear body 4a in the rear is connected to the slats 1 and give structure and stability to the entire unit when it is collapsed or extended. Various size suction cups and/or hooks conveniently slide into indents 4b & 4c formed in the rear body 4a but the suction cups are not shown in the drawings provided, only described. Can be constructed of metal, plastic, rubber, steel or a combination of materials. The indents 4b & 4c that suction cups and/or hooks can conveniently slide into with ease that allow for the unit to remain stationary when it is extended to greater length or reduced to shorter lengths. The suction cups and hooks that slide into the two separate indents are not shown in the drawings provided, only described.

Figure 4:
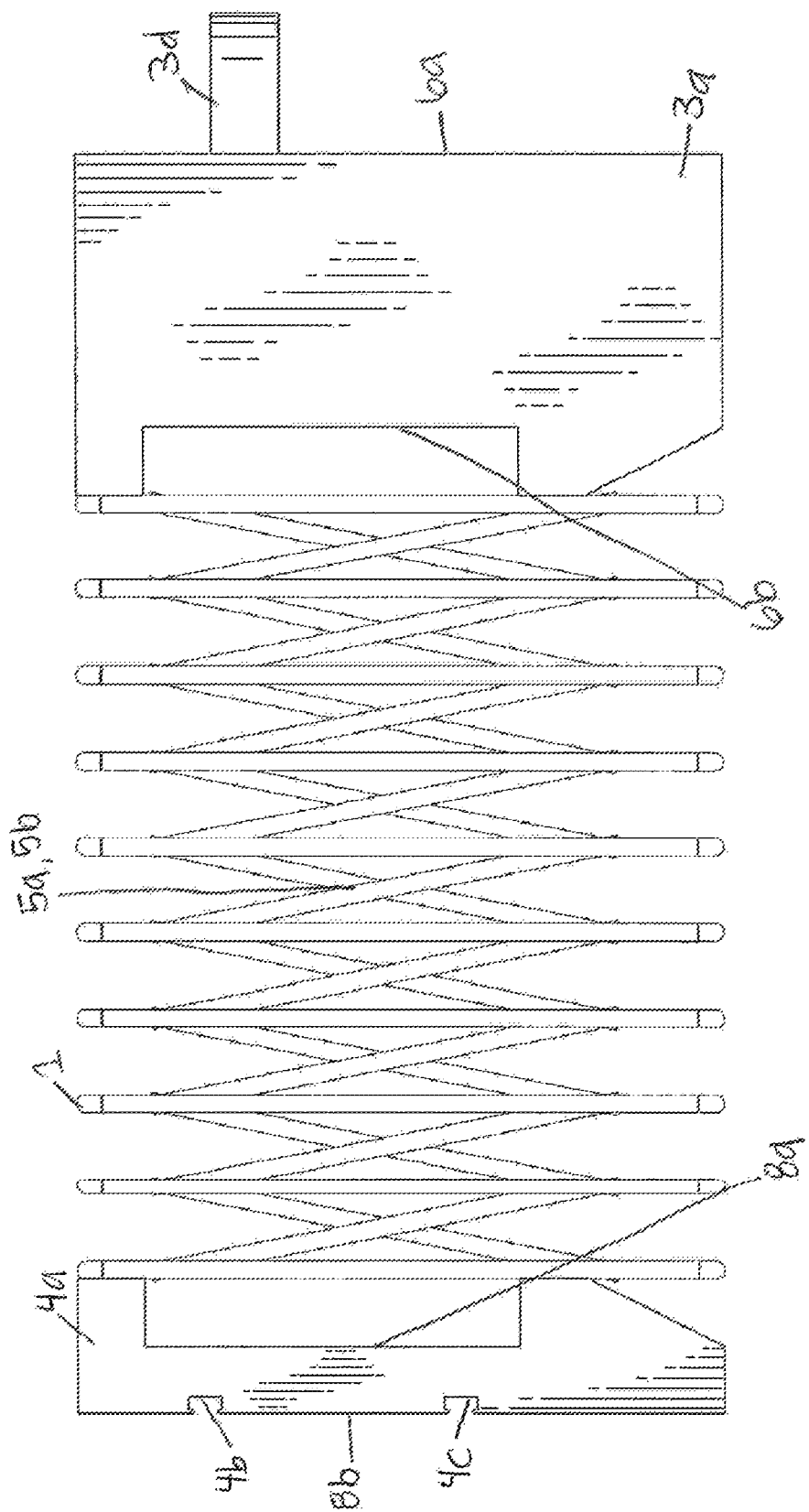
FIG. 4. is a left side elevational extended view of my new invention shown in FIG. 1; Right side being a mirror image.
Figure 7:
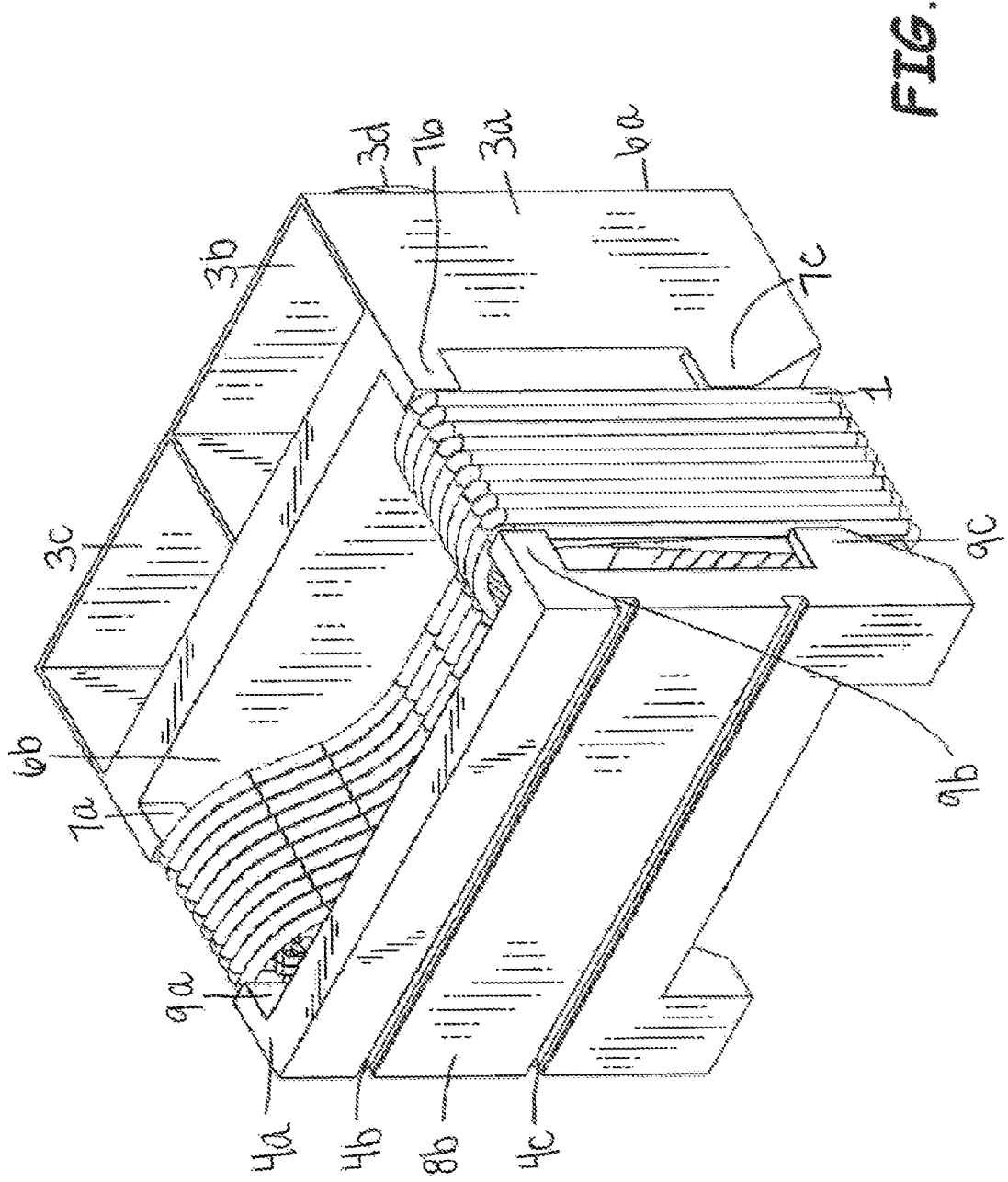
FIG. 7. is a perspective collapsed view of my new invention shown in FIG. 1.

The dish drying rack (shown in FIG. 1) is configured to collapse (as shown in FIG. 7) when the dish drying rack is not in use and extend (as shown in FIG. 4) to dry dishes thereon, the dish drying rack comprises the front body 3a comprising a front exterior wall 6a, a rear interior wall 6b opposite the front exterior wall 6a, a left side wall and a right side wall (shown in FIG. 1). A first upper projection 7a and a second upper projection 7b protrude rearwardly from the rear interior wall 6b. The first upper projection 7a and the second upper projection 7b are spaced apart from each other. At least one first lower projection 7c protrudes rearwardly from the rear interior wall 6b. The at least one first lower projection 7c is below and spaced apart from the first upper projection 7a and the second upper projection 7b respectively. The front body 3a comprises utensil holders 3c & 3b therein that are configured to hold utensils; and each utensil holder 3c & 3b comprises an open top (as shown in FIG. 1).

The dish drying rack also comprises a rear body 4a comprising a front interior wall 8a, a rear exterior wall 8b opposite the front interior wall 8a, a left side wall and a right side wall (as shown in FIG. 1). A third upper projection 9a and a fourth upper projection 9b protrude forwardly from the front interior wall 8a. The third upper projection 9a and the fourth upper projection 9b are spaced apart from each other. At least one second lower projection 9c protrudes forwardly from the front interior wall 8a. The at least one second lower projection 9c is below and spaced apart from the third upper projection 9a and the fourth upper projection 9b respectively. The rear exterior wall 8b comprises indents 4b & 4c therein.

The dish drying rack also comprises a plurality of slats 1. Each slat 1 has a first vertical portion 1a, a second vertical portion 1b, and a curved recessed portion 1c that extends between the first vertical portion 1a and the second vertical portion 1b; wherein a corresponding forward-most slat from the plurality of slats 1 is connected to the first upper projection 7a, the second upper projection 7b, and the at least one first lower projection 7c of the front body 3a; wherein a corresponding rearward-most slat from the plurality of slats 1 is connected to the third upper projection 9a, the fourth upper projection 9b, and the at least one second lower projection 9c of the rear body 4a.

The dish drying rack also comprises a first set of cross members 5a that connects the first vertical portions 1a of the plurality of slats 1 together (as shown in FIG. 1). The first set of cross members 5a are attached to the first vertical portions 1a by a plurality of first pin connection mechanisms 2a. The dish drying rack also comprises a second set of cross members 5b that connects the second vertical portions 1b of the plurality of slats 1 together (as shown in FIG. 1). The second set of cross members 5b are attached to the second vertical portions 1b by a plurality of second pin connection mechanisms 2b.

The first set of cross members 5a are configured to pivot around the plurality of first pin connection mechanisms 2a and the second set of cross members 5b are configured to pivot around the plurality of second pin connection mechanisms 2b to extend and collapse the dish drying rack.

Figure 2:
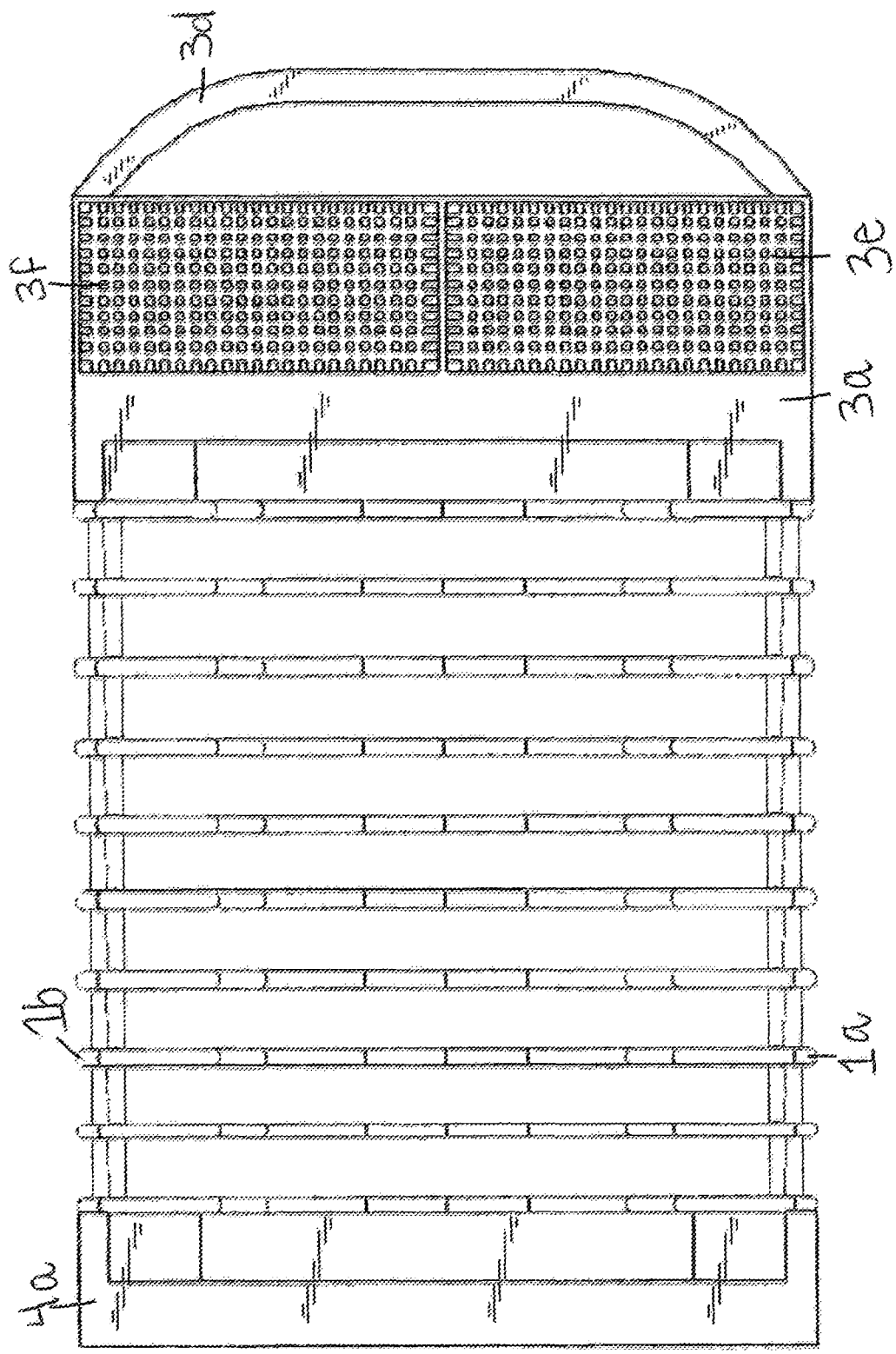
FIG. 2. is a top plan extended view of my new invention shown in FIG. 1.

Referring to FIG. 2, is a top plan extended view showing slats 1, showing the front body 3a, the drainage grates/slits 3e & 3f, the handle 3d in the front, and the rear body 4a in the rear.

Figure 3:
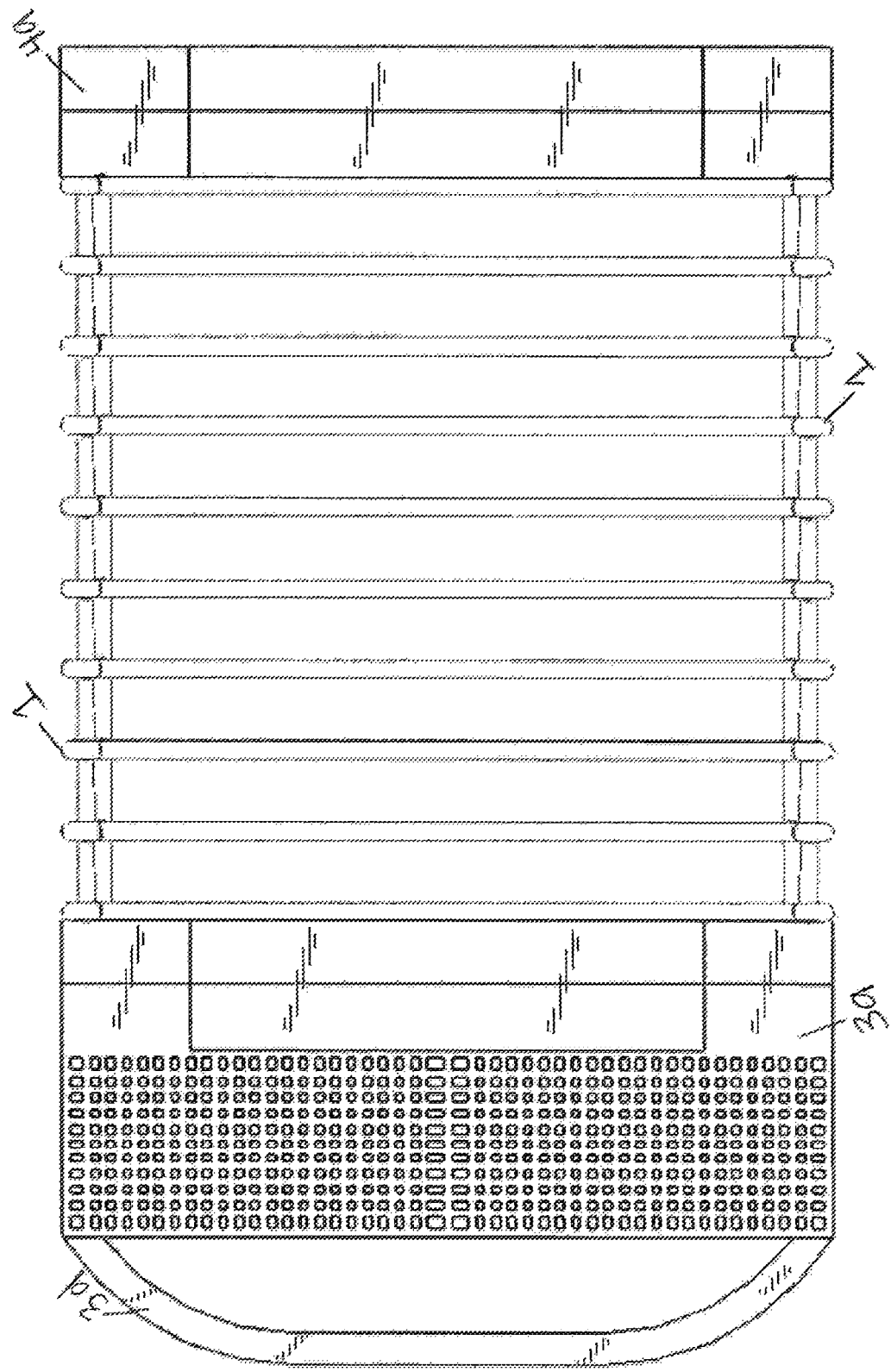
FIG. 3. is a bottom plan extended view of my new invention shown in FIG. 1.

Referring to FIG. 3, is a bottom plan extended view showing slats 1, the front body 3a, the drainage grates/slits 3e & 3f, the handle 3d in the front, and the rear body 4a in the rear.

Referring to FIG. 4, left side elevational extended view; right side being a mirror image showing slats 1, showing the cross members 5a & 5b, the front body 3a, the handle 3d in the front, the rear body 4a in the rear that has indents 4b & 4c that suction cups and/or hooks can slide into.

Referring to FIG. 5, is a front elevational view showing the front body 3a, and the handle 3d in the front.

Figure 6:
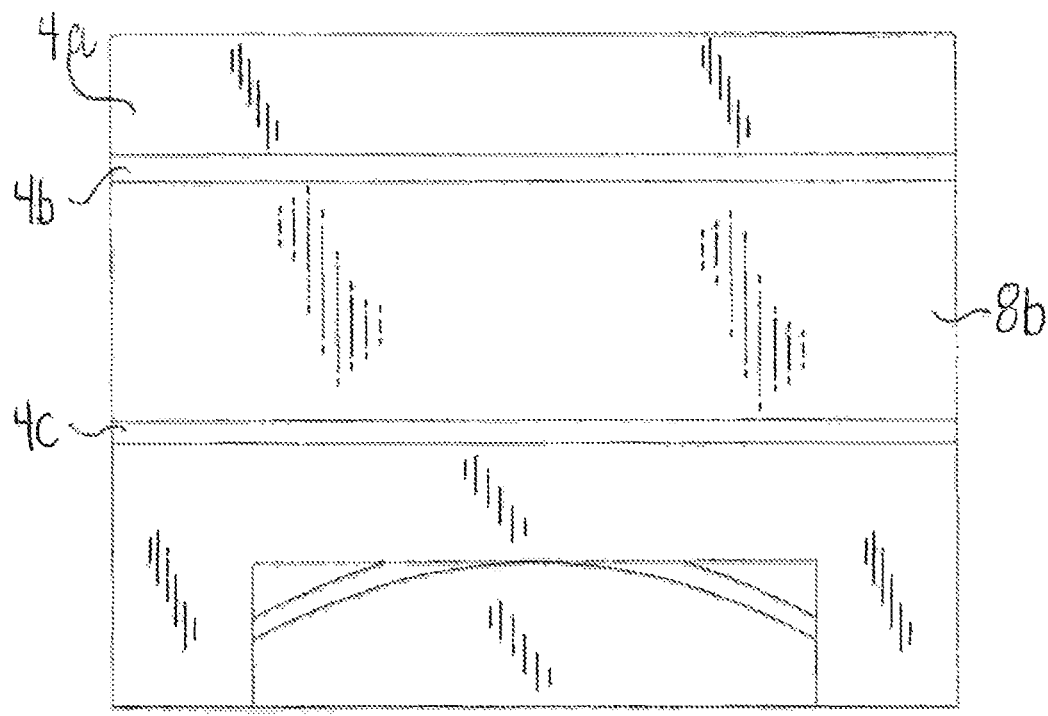
FIG. 6. is a rear elevational extended view of my new invention shown in FIG. 1.

Referring to FIG. 6, is a rear elevational extended view showing the rear body 4a in the rear, and the indents 4b & 4c that suction cups and/or hooks can slide into.

Referring to FIG. 7, is a perspective collapsed view showing slats 1, the front body 3a, the two utensil holders 3b & 3c, the handle 3d in the front, the rear body 4a in the rear and the indents 4b & 4c that suction cups and/or hooks can slide into.

Figure 8:
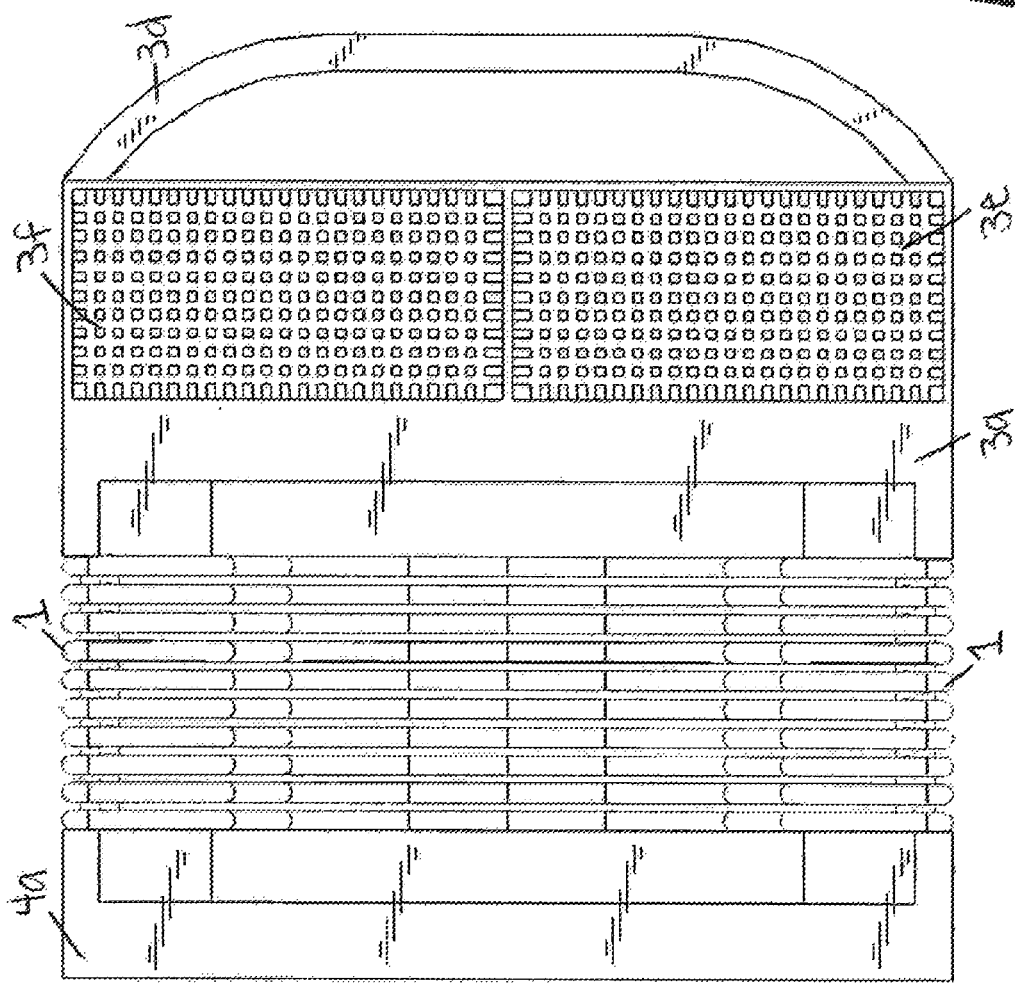
FIG. 8. is a top plan collapsed view of my new invention shown in FIG. 1.

Referring to FIG. 8, is a top plan collapsed view showing slats 1, the front body 3a, the drainage grates/slits 3e & 3f, the handle 3d in the front, the rear body 4a in the rear.

Figure 9:
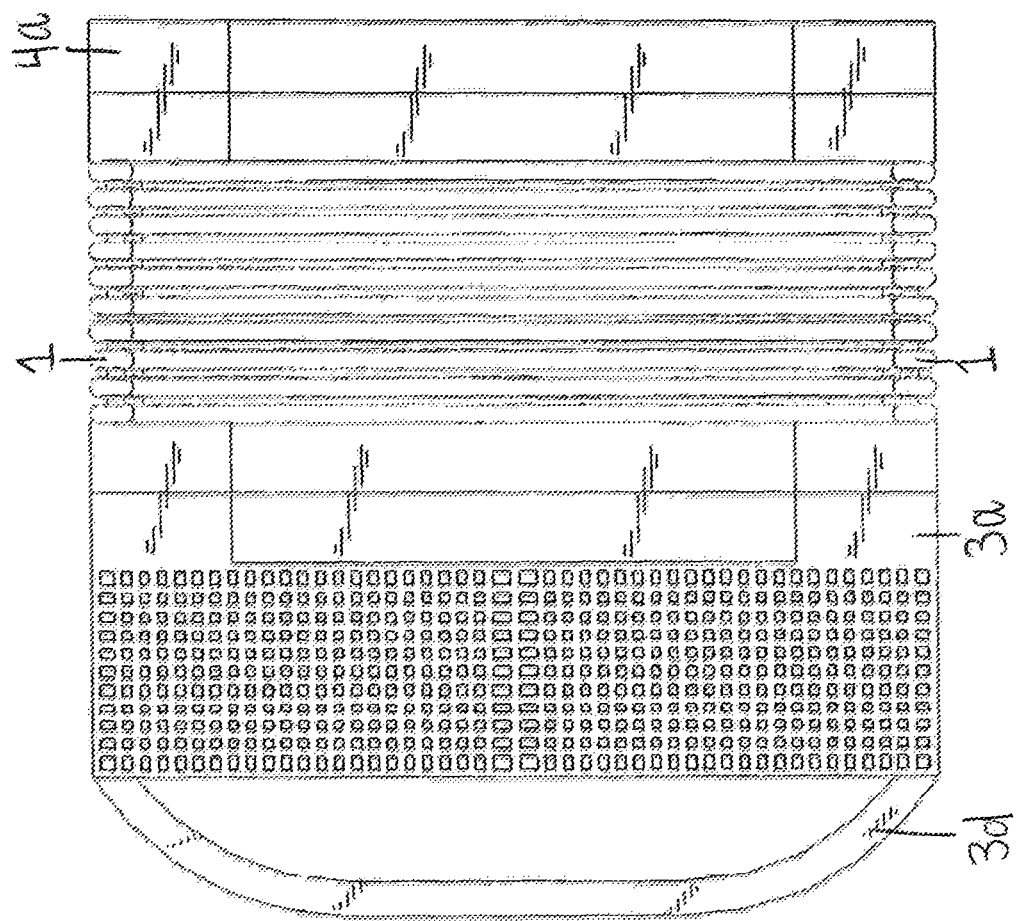
FIG. 9. is a bottom plan collapsed view of my new invention shown in FIG. 1.

Referring to FIG. 9, is a bottom plan collapsed view showing slats 1, the front body 3a, the drainage grates/slits 3e & 3f, the handle 3d in the front, the rear body 4a in the rear.

Figure 10:
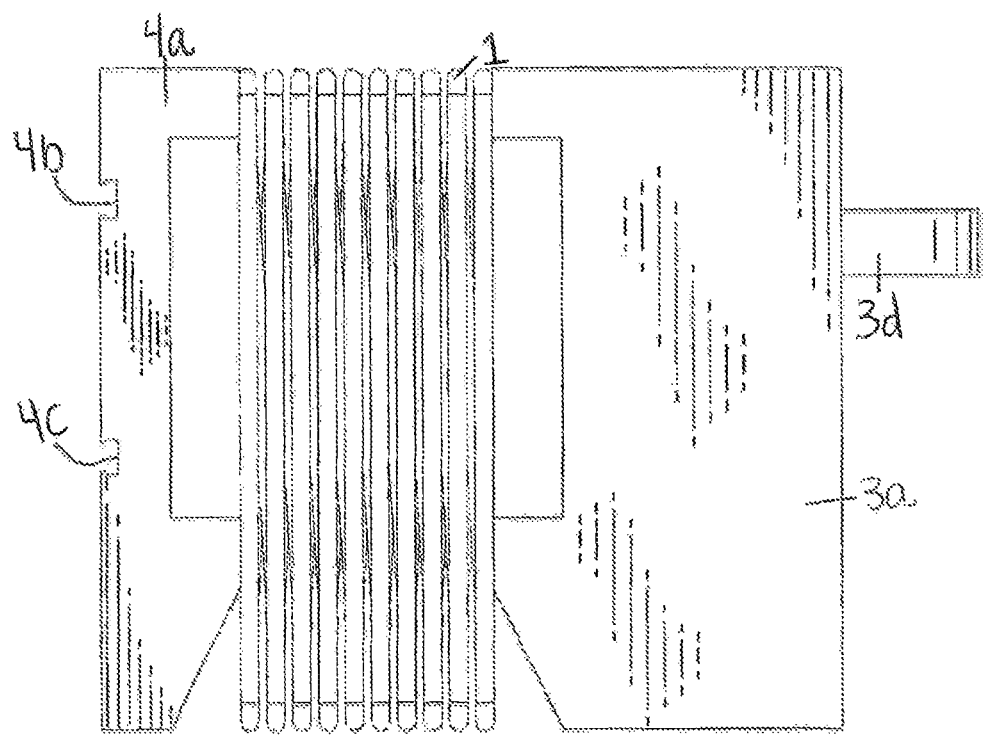
FIG. 10. is a left side elevational collapsed view of my new invention shown in FIG. 1; Right side being a mirror image.

Referring to FIG. 10, is a left side elevational collapsed view; the right side being a mirror image; showing slats 1, the front body 3a, the handle 3d in the front, the rear body 4a in the rear, and the indents 4b & 4c that suction cups and/or hooks can slide into.

Figure 11:
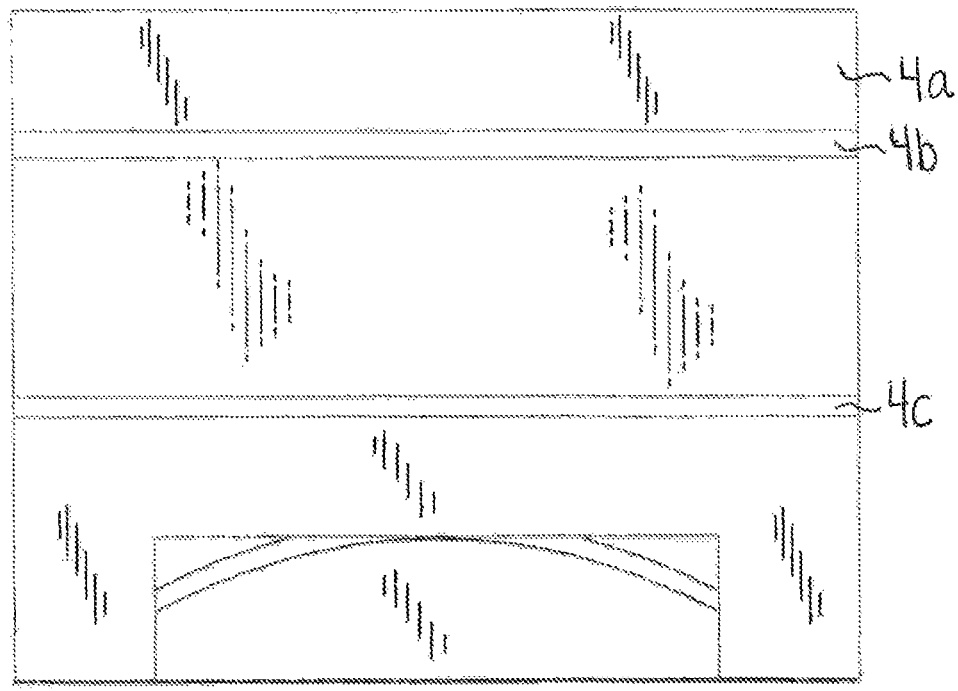
FIG. 11. is a rear elevational collapsed view of my new invention shown in FIG. 1.

Referring to FIG. 11, is a rear elevational collapsed view showing the rear body 4a in the rear, and the indents 4b & 4c that suction cups and/or hooks can slide into.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:
1. A dish drying rack that is configured to collapse when the dish drying rack is not in use and extend to dry dishes thereon, the dish drying rack comprising:
a front body comprising a front exterior wall, a rear interior wall opposite the front exterior wall, a left side wall and a right side wall; wherein a first upper projection and a second upper projection protrude rearwardly from the rear interior wall; wherein the first upper projection and the second upper projection are spaced apart from each other; wherein at least one first lower projection protrudes rearwardly from the rear interior wall, wherein the at least one first lower projection is below and spaced apart from the first upper projection and the second upper projection respectively; wherein the front body comprises at least one utensil holder therein that is configured to hold utensils; and each utensil holder comprises an open top;
a rear body comprising a front interior wall, a rear exterior wall opposite the front interior wall, a left side wall and a right side wall; wherein a third upper projection and a fourth upper projection protrude forwardly from the front interior wall; wherein the third upper projection and the fourth upper projection are spaced apart from each other;

and wherein at least one second lower projection protrudes forwardly from the front interior wall; wherein the at least one second lower projection is below and spaced apart from the third upper projection and the fourth upper projection respectively; wherein the rear exterior wall comprises at least one indent therein;

a plurality of slats, wherein each slat comprises:
   a first vertical portion, a second vertical portion, and a curved recessed portion that extends between the first vertical portion and the second vertical portion;
wherein a corresponding forward-most slat from the plurality of slats is connected to the first upper projection, the second upper projection, and the at least one first lower projection of the front body;
wherein a corresponding rearward-most slat from the plurality of slats is connected to the third upper projection, the fourth upper projection, and the at least one second lower projection of the rear body;
a first set of cross members that connects the first vertical portions of the plurality of slats together, wherein the first set of cross members are attached to the first vertical portions by a plurality of first pin connection mechanisms;
a second set of cross members that connects the second vertical portions of the plurality of slats together, wherein the second set of cross members are attached to the second vertical portions by a plurality of second pin connection mechanisms;
wherein the first set of cross members are configured to pivot around the plurality of first pin connection mechanisms and the second set of cross members are configured to pivot around the plurality of second pin connection mechanisms to extend and collapse the dish drying rack.

2. The dish drying rack according to claim 1, wherein the front body comprises plastic, metal, steel, or rubber.

3. The dish drying rack according to claim 1, wherein each utensil holder comprises plastic, metal, steel, or rubber.

4. The dish drying rack according to claim 1, wherein each utensil holder comprises a bottom that has drainage slits.

5. The dish drying rack according to claim 1, wherein the at least one utensil holder comprises two utensil holders.

6. The dish drying rack according to claim 1, wherein the at least one indent in the rear exterior wall of the rear body is configured to receive suction cups that can slide into the at least one indent.

7. The dish drying rack according to claim 1, wherein the least one indent comprises two indents.

8. The dish drying rack according to claim 1, wherein the at least one indent in the rear exterior wall of the rear body is configured to receive hooks that can slide into the at least one indent.

* * * * *